United States Patent
Cohen et al.

(10) Patent No.: US 10,928,479 B2
(45) Date of Patent: Feb. 23, 2021

(54) APPARATUS AND METHOD FOR DETERMINING A DISTANCE TO AN OBJECT

(71) Applicant: Apple Inc., Cupertino, CA (US)

(72) Inventors: Alon Cohen, Petach Tikva (IL); Eran Gerson, Pardes Hana (IL); Gaby Prechner, Rishon Lezion (IL); Michael Bogdanov, Pardes Hana (IL)

(73) Assignee: Apple Inc., Cupertino, CA (US)

( * ) Notice: Subject to any disclaimer, the term of this patent is extended or adjusted under 35 U.S.C. 154(b) by 251 days.

(21) Appl. No.: 15/951,202

(22) Filed: Apr. 12, 2018

(65) Prior Publication Data

US 2018/0341000 A1 Nov. 29, 2018

(30) Foreign Application Priority Data

May 24, 2017 (EP) .................................... 17172842

(51) Int. Cl.
| | | |
|---|---|---|
| *G01S 1/30* | (2006.01) | |
| *G01S 13/87* | (2006.01) | |
| *G01S 13/32* | (2006.01) | |
| *G01S 7/00* | (2006.01) | |
| *G01S 13/08* | (2006.01) | |
| *G01S 13/88* | (2006.01) | |
| *G01S 13/82* | (2006.01) | |

(52) U.S. Cl.
CPC ............... *G01S 1/30* (2013.01); *G01S 7/003* (2013.01); *G01S 13/08* (2013.01); *G01S 13/325* (2013.01); *G01S 13/87* (2013.01); *G01S 13/88* (2013.01); *G01S 13/825* (2013.01)

(58) Field of Classification Search
CPC ............... G01S 13/46; G01S 2013/462; G01S 2013/466; G01S 2013/468; G01S 13/825; G01S 1/30; G01S 7/003; G01S 13/88; G01S 13/87
See application file for complete search history.

(56) References Cited

U.S. PATENT DOCUMENTS

| | | | | |
|---|---|---|---|---|
| 5,790,052 | A * | 8/1998 | Grabow | G01S 5/06 235/384 |
| 6,055,042 | A * | 4/2000 | Sarangapani | G01S 13/931 356/4.01 |
| 6,628,227 | B1 * | 9/2003 | Rao | G01S 15/876 342/70 |

(Continued)

FOREIGN PATENT DOCUMENTS

| | | |
|---|---|---|
| DE | 102013008953 A1 | 11/2014 |
| WO | 2005045455 A2 | 5/2005 |

*Primary Examiner* — Peter M Bythrow
(74) *Attorney, Agent, or Firm* — Kowert, Hood, Munyon, Rankin & Goetzel, P.C.

(57) ABSTRACT

An apparatus for determining a distance to an object is provided. The apparatus includes a first transceiver configured to transmit a first radio frequency signal. Further, the apparatus includes a second transceiver configured to transmit a second radio frequency signal in response to receiving the first radio frequency signal. The apparatus additionally includes a processing circuit configured to determine the distance to the object based on a transmission time of the first radio frequency signal and a reception time, at the first transceiver, of a reflected component of the second radio frequency signal that is reflected by the object.

25 Claims, 5 Drawing Sheets

(56) References Cited

U.S. PATENT DOCUMENTS

| | | | |
|---|---|---|---|
| 6,992,613 B2 * | 1/2006 | Yoneda | G01S 13/878 |
| | | | 342/118 |
| 8,515,454 B2 * | 8/2013 | Shepherd | H04W 64/00 |
| | | | 455/456.2 |
| 10,175,354 B2 * | 1/2019 | Fukuman | G01S 15/878 |
| 10,175,355 B2 * | 1/2019 | Fukuman | G01S 15/931 |
| 10,436,899 B2 * | 10/2019 | Fukuman | G01S 15/878 |
| 10,578,736 B2 * | 3/2020 | Fukuman | G01S 15/46 |
| 2004/0203877 A1 * | 10/2004 | Golden | G01S 13/74 |
| | | | 455/456.1 |
| 2005/0046606 A1 * | 3/2005 | Yoneda | G01S 13/878 |
| | | | 342/70 |
| 2008/0018521 A1 | 1/2008 | Sahinoglu | |
| 2008/0204322 A1 * | 8/2008 | Oswald | G01S 5/04 |
| | | | 342/465 |
| 2008/0231498 A1 * | 9/2008 | Menzer | G01S 13/765 |
| | | | 342/134 |
| 2008/0248808 A1 * | 10/2008 | Alizadeh-Shabdiz | |
| | | | H04W 64/006 |
| | | | 455/456.1 |
| 2011/0148710 A1 * | 6/2011 | Smid | G01S 13/84 |
| | | | 342/394 |
| 2012/0280862 A1 * | 11/2012 | Moffatt | G01S 13/765 |
| | | | 342/386 |
| 2013/0162461 A1 * | 6/2013 | Lucking | G01S 15/931 |
| | | | 342/70 |
| 2014/0179340 A1 * | 6/2014 | Do | G01S 13/765 |
| | | | 455/456.1 |
| 2016/0077204 A1 * | 3/2016 | Lee | G01S 7/42 |
| | | | 342/126 |
| 2016/0277196 A1 * | 9/2016 | Jose | G01S 13/825 |
| 2016/0366660 A1 | 12/2016 | Segev et al. | |
| 2017/0176583 A1 * | 6/2017 | Gulden | G01S 13/9029 |
| 2018/0284267 A1 * | 10/2018 | Maisel | G01S 7/352 |
| 2018/0348359 A1 * | 12/2018 | Wall | G01S 13/825 |
| 2019/0154439 A1 * | 5/2019 | Binder | G01S 15/08 |

\* cited by examiner

APPARATUS AND METHOD FOR DETERMINING A DISTANCE TO AN OBJECT

FIELD

Examples relate to measuring a distance to an object. In particular, examples relate to an apparatus and a method for determining a distance to an object.

BACKGROUND

Radar systems are becoming more and more common in commercial use cases (e.g. autonomous driving, autonomous machines, drones, mapping, etc.). Moving from defense use cases to commercial use cases requires radar systems with reduced costs, power consumption and size.

Hence, there may be a desire for improved radar techniques.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
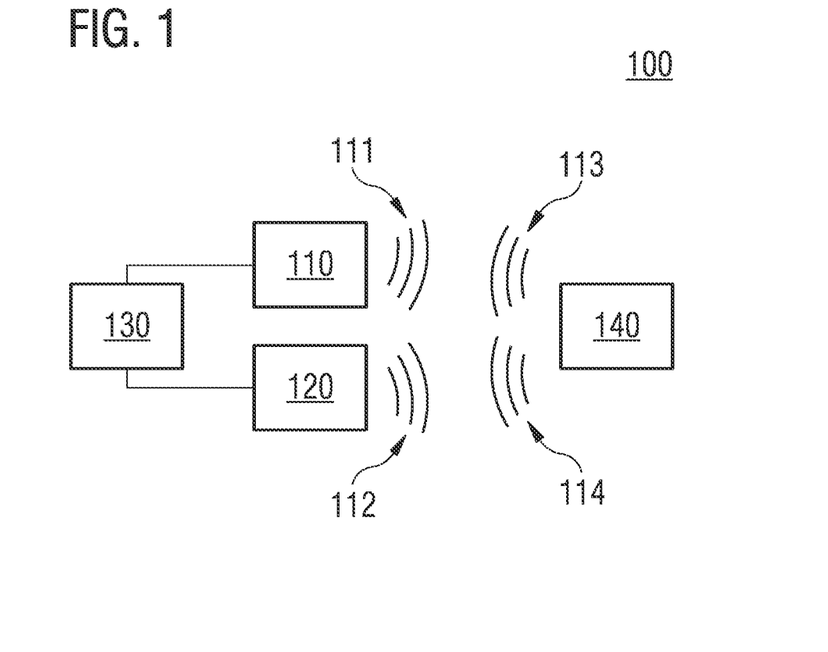
FIG. 1 illustrates an example of an apparatus for determining a distance to an object.

FIG. 1 illustrates an apparatus 100 for determining (measuring) a distance to an object 140. The apparatus 100 comprises a first transceiver 110 configured to transmit a first radio frequency signal 111. Further, the apparatus 100 comprises a second transceiver 120 configured to transmit a second radio frequency signal 112 in response to receiving the first radio frequency signal 111. The apparatus 100 additionally comprises a processing circuit 130 configured to determine (calculate) the distance to the object 140 based on a transmission time of the first radio frequency signal 111 and a reception time, at the first transceiver 110, of a reflected component 113 of the second radio frequency signal that is reflected by the object 140.

The apparatus 100 may enable to determining (calculate) the distance of the apparatus 100 to the object 140 since the reception time of the reflected component 113 of the second radio frequency signal is used for the determination. Accordingly, the time-of-flight of the second radio frequency signal 112 from the second transceiver 120 via the object 140 to the first transceiver 110 may be determined, and the distance of the apparatus 100 to the object 140 may be determined therefrom.

A carrier frequency of the first radio frequency signal 111 and/or the second radio frequency signal 112 may be, e.g., about 700 MHz or more, 5 GHz or more, 10 GHz or more, 20 GHz or more, or 50 GHz or more.

In some examples, the first radio frequency signal 111 and the second radio frequency signal 112 are compliant to the IEEE 802.11 family of standards of the Institute of Electrical and Electronics Engineers. That is, the first transceiver 110 and/or the second transceiver 120 may be Wireless Local Area Network (WLAN) transceivers (e.g. Wi-Fi or WiGig compliant). Accordingly, the first radio frequency signal 111 and the second radio frequency signal 112 may be WLAN signals. WLAN transceivers for the apparatus 100 in the present disclosure may allow to use commercially available WLAN transceivers for radar or other applications.

In the present disclosure, the proposed distance measurement is not limited to WLAN transceivers. Any transceiver suitable to transmit and receive radio frequency signals may also be used.

The object 140 may include any kind of object. An object stationary to the apparatus 100 as well as an object moving relative to the apparatus 100. A metallic object (e.g. a steel post) as well as a non-metallic object (e.g. a plastic). A conducting object (e.g. a power line) as well as a non-conducting object (an isolator). A solid object (e.g. a wall) as well as a soft object (e.g. tissue). A biological object (e.g. tissue, a human being or an animal) as well as a non-biological object (e.g. a stone or a wall).

The apparatus 100 may, e.g., further comprise an antenna system (not illustrated) configured to radiate the first radio frequency signal 111 and the second radio frequency signal 112 towards the object 140. That is, the first transceiver 110 and the second transceiver 120 share a single antenna system for radiating radio frequency signals towards the object.

For example, the antenna system may comprise a first antenna element configured to radiate the first radio frequency signal 111 into the environment, and a second antenna element configured to radiate the second radio frequency signal 112 into the environment. The first antenna element and the second antenna element are oriented towards the object 140. That is, the antenna system may comprise individual antenna elements associated to the transceivers, wherein all the antenna elements are directed towards the object 140.

The antenna system may additionally comprise an actuator configured to adjust an orientation of the first and second antenna elements. This may allow to orient the antenna elements towards different objects or to determine the distance to a moving object. For example, the actuator may be rotator which rotates the antenna elements around a defined axis of rotation. Accordingly, distances to objects around the whole axis of rotation may be determined.

In alternative examples, the antenna system may comprise an antenna array configured to radiate the first radio frequency signal 111 and the second radio frequency signal 112 into the environment. A main lobe of the antenna array's radiation pattern is oriented towards the object 140. That is, beam forming may be used to focus the first radio frequency signal 111 and the second radio frequency signal 112 on the object 140 by means of the antenna array.

The processing circuit 130 may be further configured to determine the distance to the object 140 based on a transmission time of the second radio frequency signal 112 and a reception time, at the second transceiver 120, of a reflected component 114 of the first radio frequency signal that is reflected by the object 140. By taking into account these additional information, a round-trip time including the reflection at the object 140 may be determined (i.e. the time it takes for the first radio frequency signal 111 to be sent to the second transceiver 120 via the object 140 plus the length of time it takes for the second radio frequency signal 112 to be sent to the first transceiver 110 via the object 140).

For example, the processing circuit 130 may be configured to determine the distance to the object 140 based on a relationship between the speed of light, a first difference between the transmission time of the first radio frequency signal 111 and the reception time, at the first transceiver 110, of the reflected component 113 of the second radio frequency signal, a second difference between the transmission time of the second radio frequency signal 112 and the reception time, at the second transceiver 120, of the reflected component 114 of the first radio frequency signal, a difference between the first difference and the second difference, and a constant.

The processing circuit 130 may be configured to determine the distance to the object 140, e.g., based on expression which is mathematically correspondent to:

$$d = \frac{1}{2} \cdot \frac{(ToA_1 - ToD_1) - (ToD_2 - ToA_2)}{2} \cdot c, \quad (1)$$

with d denoting the distance to the object, c denoting the speed of light, $ToD_1$ denoting the transmission time of the first radio frequency signal, $ToA_1$ denoting the reception time of the reflected component of the second radio frequency signal, $ToD_2$ denoting the transmission time of the second radio frequency signal, and $ToA_2$ denoting the reception time of the reflected component of the first radio frequency signal.

The first radio frequency signal 111 and the second radio frequency signal 112 may, in some examples, be signals of a burst of a Fine Time Measurement (FTM) according to the IEEE 802.11 family of standards of the Institute of Electrical and Electronics Engineers.

Figure 5:
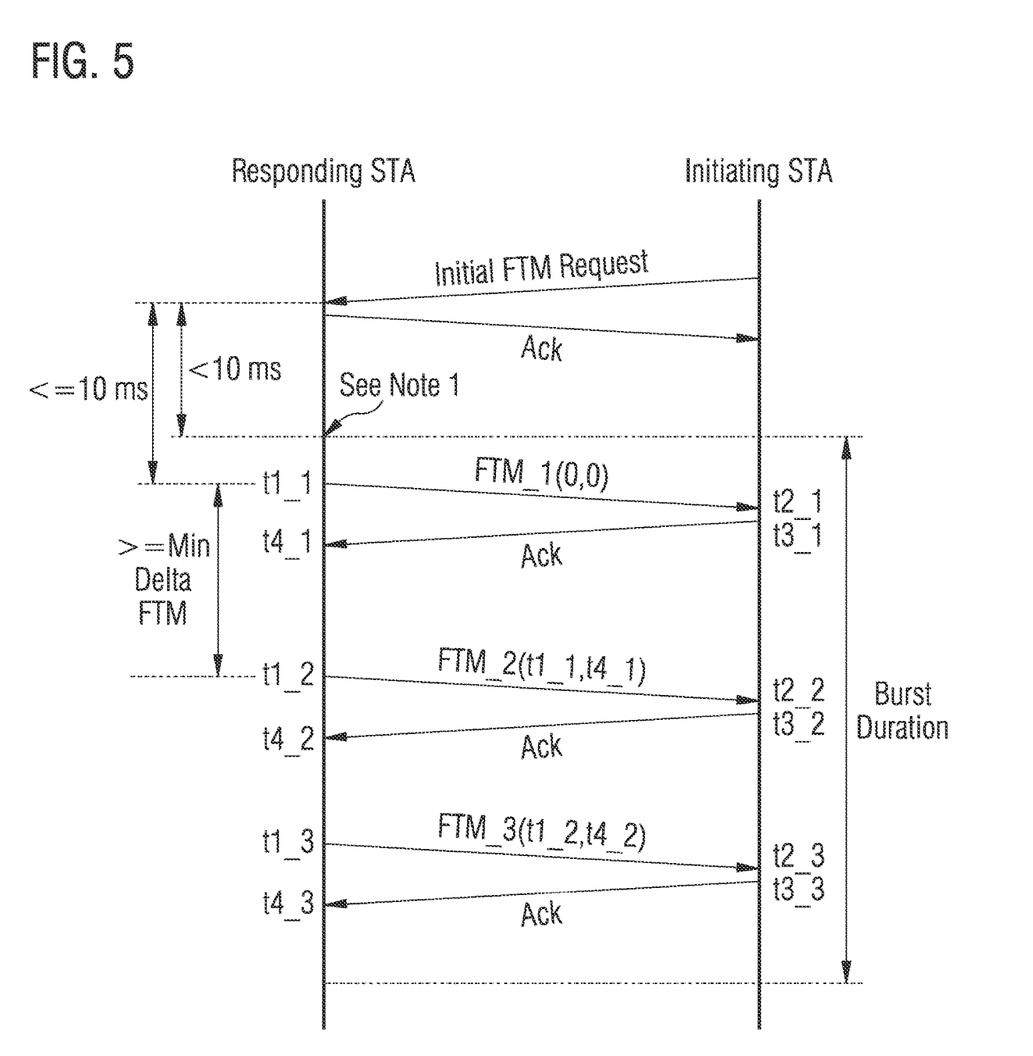
FIG. 5 illustrates an example of a Fine Timing Measurement (FTM) scheme.

FTM enables a resolution in the range of centimeters. In a regular FTM (as illustrated in FIG. 5) for determining a distance between two transceivers, the transceivers (and their antennas) face each other. The first transceiver sends an FTM request to the second transceiver, which acknowledges the receipt. After that, the second transceiver sends a first FTM packet, which is acknowledged by the first transceiver. This procedure is repeated several times during a burst, wherein the FTM packets of the first transceiver comprise information on the Time of Departure (ToD) of the previous FTM frame and information on the Time of Arrival (ToA) of the acknowledgement of the previous FTM packet. In this configuration, both devices measure the direct path between each other.

In contrast to that, the antenna system of both the first and second transceivers 110, 120 faces the object 140 as illustrated in FIG. 1 and an FTM between the first and second transceivers 110, 120 is performed. Accordingly, the combined range between each of the first and second transceivers 110, 120 and the object 140 may be determined with high accuracy using the reflected component of the first and/or the second radio frequency signal 111, 112 (instead of the component of the first and/or the second radio frequency signal 111, 112 which takes the direct path between both transceivers). By dividing the range by two, the distance of the apparatus 100 to the object 140 may be determined with the high accuracy of the FTM.

The processing circuit 130 may, e.g., be configured to select a reception time of a signal peak of the received first radio frequency signal having the greatest amplitude as the reception time of the reflected component 114 of the first radio frequency signal. Also, the processing circuit 130 may be configured to select a reception time of a signal peak of the received second radio frequency signal having the greatest amplitude as the reception time of the reflected component 113 of the second radio frequency signal. If the first/second radio frequency signal 111/112 is focused on the object 140, the highest peak in the signal received at the first/second transceiver 110, 120 corresponds to the component reflected by the object 140. Hence, the reflected component of the received signal may be determined by selecting the highest peak of the receive signal (details will be explained in connection with FIGS. 3 and 4).

For radio frequency signals having a carrier frequency of 50 GHz or more (e.g. radio frequency signals which are compliant to WiGig), the individual peaks of the received signal at one of the first and the second transceivers 110, 120 may be resolved using an FTM algorithm. However, for radio frequency signals having a lower carrier frequency (e.g. radio frequency signals which are compliant to Wi-Fi), the individual peaks of the signal received the transceiver cannot be resolved using FTM algorithms. Therefore, the processing circuit 130 may be configured to determine a reception time of the received second radio frequency signal using an algorithm for a FTM according to the IEEE 802.11 family of standards of the Institute of Electrical and Electronics Engineers.

Further, the processing circuit 130 may be configured to determine, using another algorithm (e.g. MUSIC algorithm or ESPRIT algorithm), a correction value for the reception time of the received second radio frequency signal based on the received second radio frequency signal, and to determine the reception time of the reflected component 113 of the second radio frequency signal by combining the reception time of the received second radio frequency and the correction value. The determination of the correction value and the determination of the reception time of the received second radio frequency signal may be done in parallel in order to speed up the determination of the reception time of the reflected component 113 of the second radio frequency signal.

Further, the apparatus 100 may comprise a first semiconductor chip comprising the first transceiver 110, and a second semiconductor chip comprising the second transceiver 120. In other words, the first transceiver 110 and the second transceiver 120 may be arranged on different semiconductor chips. This may allow to increase the power of the first and/or the second radio frequency signal 111, 112. Accordingly, greater distances between the apparatus 100 and the object 140 may be measured by the apparatus 100.

Generally speaking, some examples presented herein relate to a means for determining a distance to an object. The means comprises a means for transmitting a first radio frequency signal, and a means for transmitting a second radio frequency signal in response to receiving the first radio frequency signal. Additionally, the means comprises a means for determining the distance to the object based on a transmission time of the first radio frequency signal and a reception time, at the means for transmitting the first radio frequency signal, of a reflected component of the second radio frequency signal that is reflected by the object.

The means for determining the distance to the object may be further configured to determine the distance to the object based on a transmission time of the second radio frequency signal and a reception time, at the means for transmitting the second radio frequency, of a reflected component of the first radio frequency signal that is reflected by the object.

The means for determining a distance to an object may be implemented by an apparatus for determining a distance to an object described above or below (e.g. FIG. 1). The means for transmitting a first radio frequency signal may be implemented by a first transceiver described above or below (e.g. FIG. 1). The means for transmitting a second radio frequency signal may be implemented by a second transceiver described above or below (e.g. FIG. 1). The means for determining the distance to the object may be implemented by a processing circuit described above or below (e.g. FIG. 1).

Figure 2:
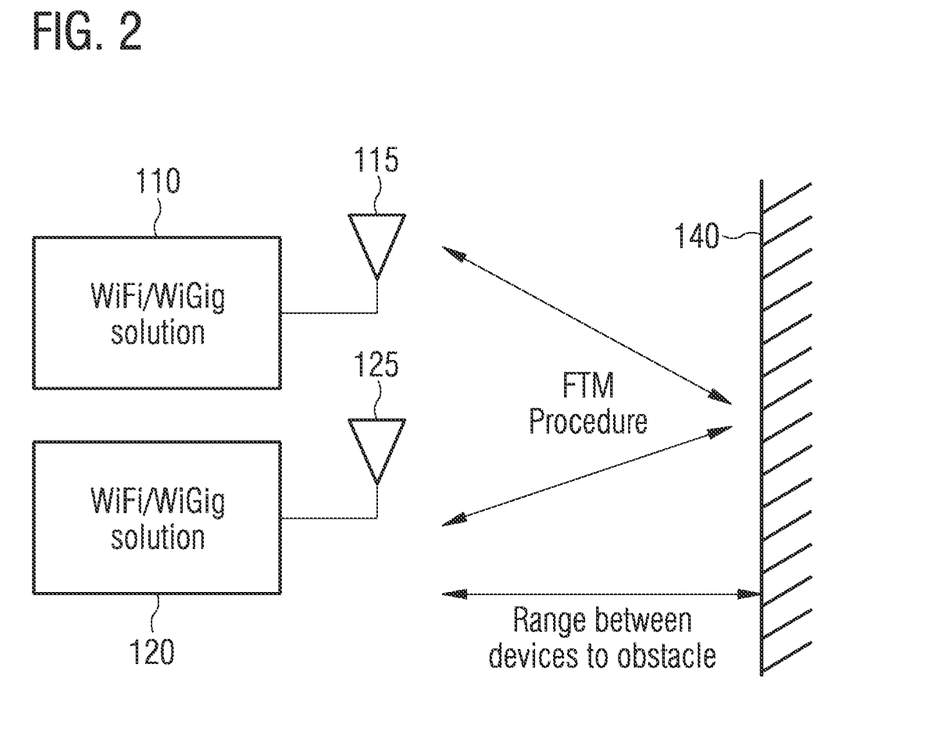
FIG. 2 illustrates an example of a distance determination.
Figure 3:
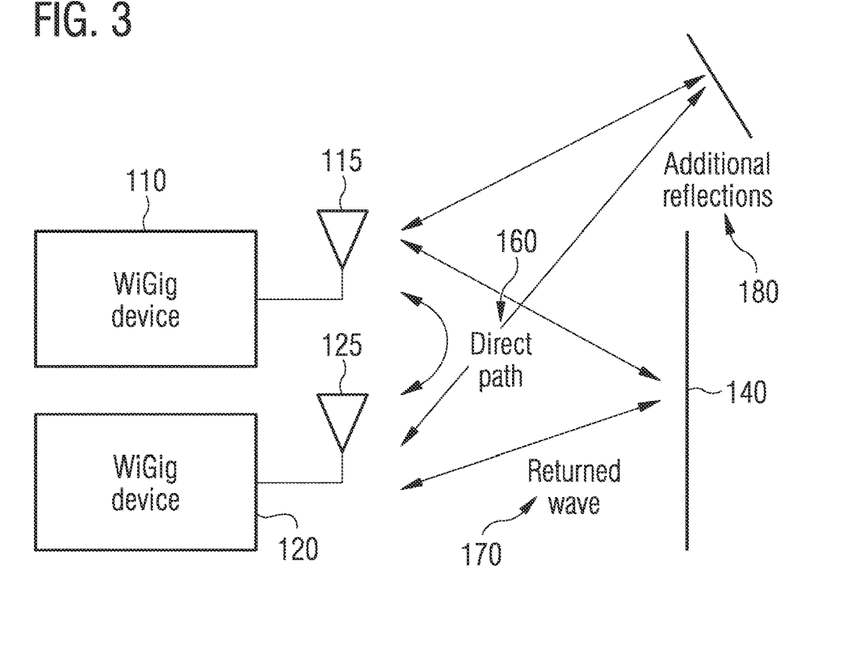
FIG. 3 illustrates an example of radio frequency signals present during the determination procedure.
Figure 4:
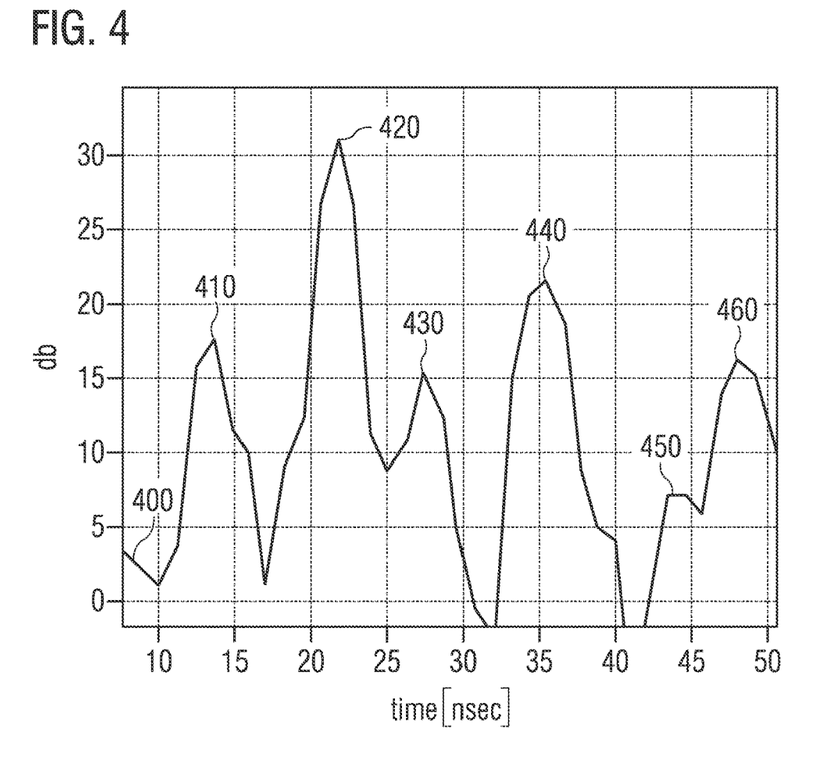
FIG. 4 illustrates an example of a radio frequency signal received by one the transceivers.

An example of a distance measurement using FTM is illustrated in FIGS. 2 to 4. Although the FTM procedure is described with respect to this example, any other round trip time procedure may be used.

FIG. 2 illustrates an exemplary general concept. Two transceivers 110, 120 and their antennae 115, 125 may be placed close to each other, so that the antennae 115, 125 face onward to the object (obstacle) 140, i.e. the antennae are oriented (directed) towards the object 140. The transceivers 110, 120 may, e.g., be implemented by two commercially available Wi-Fi or WiGig transceiver chips with FTM capability in order to realize the radar system of FIG. 2. In the following, the FTM procedure which is performed between the two transceivers 110 and 120 is described in more detail.

The first transceiver 110 measures the transmission time (ToD) of the FTM packet (i.e. the first radio frequency signal) it sends via the antenna 115. The electromagnetic wave reaches the object 140 and part of the energy returns back.

The second transceiver 120 measures the reception time (ToA) of the returned electromagnetic wave (i.e. the reflected component of the first radio frequency signal that is reflected by the object 140). Further, the second transceiver 120 transmits back an FTM packet (i.e. the second radio frequency signal) as defined in the FTM protocol, and measure the ToD. Accordingly, the first transceiver 110 computes the ToA of the electromagnetic wave that was returned from the object 140, and not the ToA related to the direct path between the transceivers 110, 120.

An overview of the signals travelling between the transceivers 110, 120 and the object is illustrated in FIG. 3. As illustrated in FIG. 3, there is a direct path 160 between the transceivers 110 and 120 (i.e. a path between the transceivers 110 and 120 without obstacles). Further, there is a reflection path 170 illustrating the reflection of the radiated electromagnetic waves (FTM packets) by the object 140. Additionally, there may be one or more further paths 180 corresponding to reflections of the FTM packets from further objects in the vicinity of the transceivers 110, 120 and/or the object 140.

An example of a temporal course of a resulting radio frequency receive signal 400 at one of the transceivers 110, 120 is illustrated in FIG. 4. The radio frequency receive signal 400 comprises a plurality of peaks. The first (temporal earliest) peak 410 relates to the direct path 160 in FIG. 3, since the direct path 160 between the antennae 115, 125 of the transceivers 110, 120 is the shortest path. The second peak 420 is related to the reflection path 170 in FIG. 3. The second peak 420 has the greatest amplitude since the antennae 115, 125 are oriented towards the object 140, so that a main portion of the radiated electromagnetic energy is radiated towards the object 140. Accordingly, the electromagnetic wave reflected by the object 140 comprises the most energy compared to the other components of the radio frequency signal 400. The peaks 430, 440, 450 and 460 are related to further paths 180 in FIG. 3, i.e. to reflections of the transmitted FTM packet from objects other than the object 140.

Accordingly, by selecting the peak of the radio frequency receive signal 400 having the greatest amplitude, the reception time of the reflected component of the radio frequency receive signal 400 may be determined. As discussed above, for radio frequency signals compliant to WiGig (i.e. signals having a carrier frequency of 50 GHz or more), FTM algorithms may resolve the individual peaks of the radio frequency receive signal 400. Accordingly, the reception time of the reflected component of the radio frequency receive signal 400 may be determined via a conventional FTM algorithm. For radio frequency signals compliant to Wi-Fi (i.e. signals having a carrier frequency of up to 10 GHz), FTM algorithms cannot resolve the individual peaks of the radio frequency receive signal 400 anymore. Therefore, a correction may be determined (calculated) in parallel using another algorithm for determining the reception time (ToA) such as, e.g., the MUSIC algorithm.

The range between both antennae 115, 125 and the object 140 is then determined according to $$r = \frac{(ToA_1 - ToD_1) - (ToD_2 - ToA_2)}{2} \cdot c, \qquad (2)$$

with r denoting the range.

By dividing the range r by two, the range (distance) between one of the antennae 115, 125 and the object is determined, i.e. according to above expression (1).

In order to determine the correct distance, the ToA for each antennae 115, 125 needs to be done according to correct peak timing. An FTM algorithm may use the WiGig good special separation to select the strongest peak, assuming energy was focused towards the obstacle before the measurement. For Wi-Fi this is not possible so that the exact peak timing is determined with oversampling (as explained above) and a fine time correction is added to the ToA value. That is, the correct peak arrival time is added to the ToA of the detected FTM packed as fine correction:

$$d = \qquad (3)$$
$$\frac{1}{2} \cdot \frac{((ToA_1 + T_{correction1}) - ToD_1) - (ToD_2 - (ToA_2 + T_{correction2}))}{2} \cdot c,$$

with $T_{correction1}$ denoting the fine time correction (correction value) for the arrival time of the second radio frequency signal at the first transceiver 110, and $T_{correction2}$ denoting the fine time correction (correction value) for the arrival time of the first radio frequency signal at the second transceiver 120.

Mapping the entire environment may be done, e.g., mechanically by a rotator, or electrically by beam forming using an array of antennas. Further, the apparatuses/arrangements described above may comprise additional components/elements such as, e.g. switches, (external) power amplifiers or low-noise amplifiers.

Using distance measurement according to the above example, distances may be determined with an accuracy of centimeters. This is evident from the comparison illustrated in FIG. 6 between real distances and distances measured by an example of an apparatus according to one or more aspects of the proposed architecture or one or more examples described above.

Figure 6:
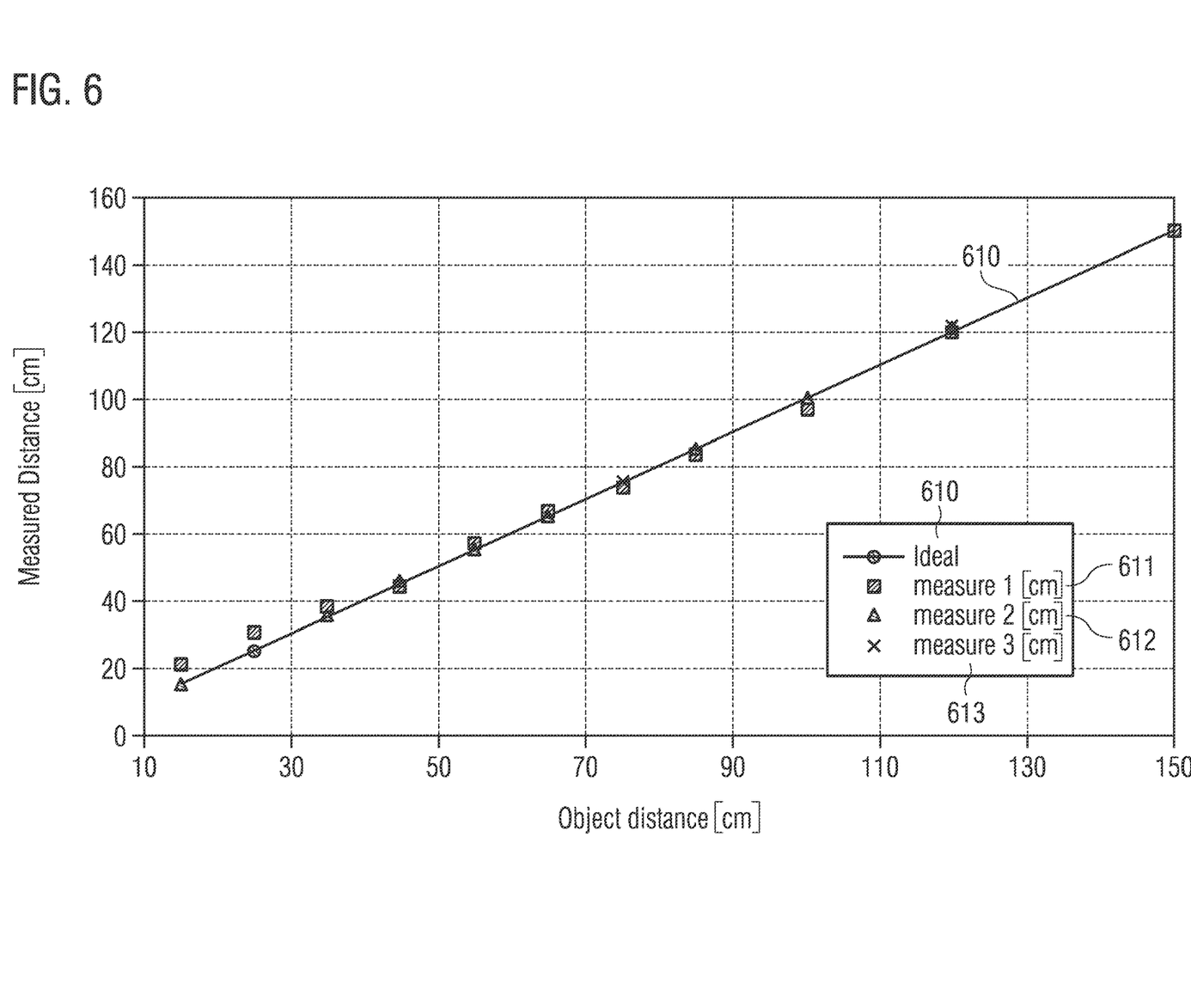
FIG. 6 illustrates a comparison between real distances and distances determined by an example of an apparatus for determining a distance to an object.

The abscissa denotes the real distance between the antenna system of the transceivers and the object. The ordinate denotes the measured distance. As a reference, line 610 illustrates ideal measurements without any errors.

Three measurement series 611, 612, 613 for eleven different distances between the antenna system of the transceivers and the object were made. It is evident from FIG. 6 that the measurement points are very close to line 610. Especially for distances greater than 30 cm, the accuracy is very high.

Figure 7:
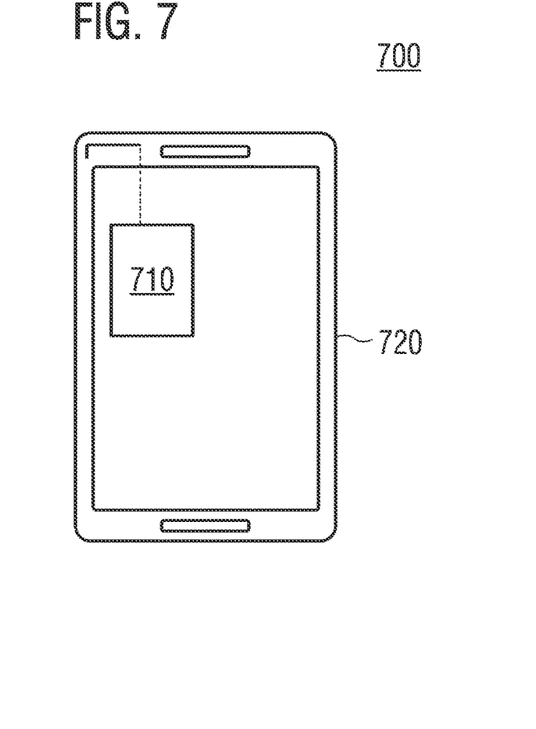
FIG. 7 illustrates an example of a user equipment comprising an apparatus for determining a distance to an object.

An example of an implementation using an apparatus for measuring a distance to an object according to one or more aspects of the proposed architecture or one or more examples described above is illustrated in FIG. 7. FIG. 7 schematically illustrates an example of a mobile device 700 (e.g. mobile phone, smartphone, tablet-computer, or laptop) comprising an apparatus 710 for measuring a distance to an object (not illustrated) according to an example described herein. Further illustrated is an antenna system 720 of the apparatus 710 for radiating the first radio frequency signal and the second radio frequency signal towards the object. Additionally, the antenna system 720 may be used for receiving the reflected components of the first and/or the second radio frequency signals which were reflected by the object. To this end, mobile device may be provided with radar functionality.

Figure 8:
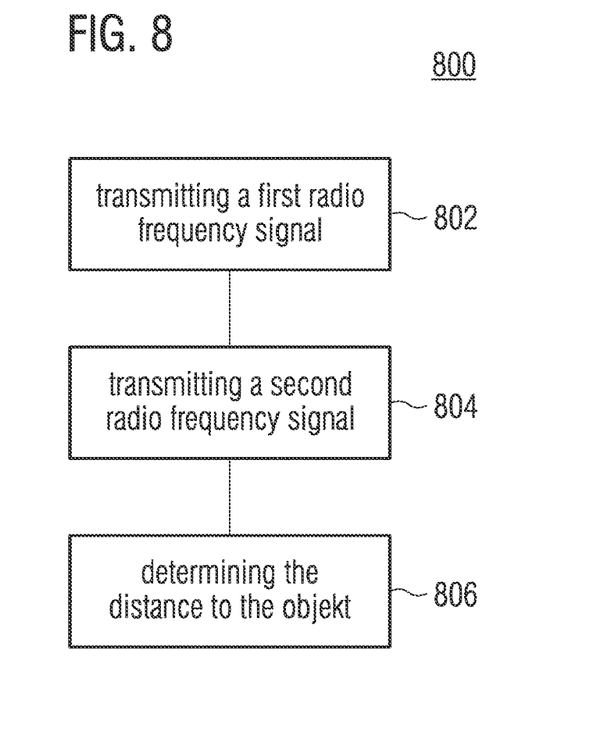
FIG. 8 illustrates a flowchart of an example of a method for determining a distance to an object.

An example of a method 800 for determining a distance to an object is illustrated by means of a flowchart in FIG. 8. The method 800 comprises transmitting 802 a first radio frequency signal by a first transceiver and transmitting 804, by a second transceiver, a second radio frequency signal in response to receiving the first radio frequency signal. Additionally, the method 800 comprises determining (calculating) 806 the distance to the object based on a transmission time of the first radio frequency signal and a reception time, at the first transceiver, of a reflected component of the second radio frequency signal that is reflected by the object.

More details and aspects of the method are mentioned in connection with the proposed concept or one or more examples described above (e.g. FIGS. 1-6). The method may comprise one or more additional optional features corresponding to one or more aspects of the proposed concept or one or more examples described above.

There may be a number of benefits for the proposed architecture compared to other solutions: The apparatus for measuring a distance to an object may be based on commercial chips without any changes of the same. Therefore, the solution may be very accessible and cheap for the mass market, since it does not require a dedicated hardware solution. The above described FTM based approach using at least two chips may be much simpler to implement than conventional radar, so that a lot of technological challenges in legacy radars using concurrent transmission and reception may be overcome. The proposed architecture may be used for high distance ranges that are required for automotive applications or drones, if the two transceivers are implemented in different semiconductor chips.

The proposed distance measurement is not limited to mobile devices. The proposed distance measurement may be used for any kind of radar or radar-like application. For example, the proposed distance measurement may be used for automotive applications, drones, security applications, autonomous machine applications, mapping applications, virtual reality applications, 3D scanning applications, or medical applications.

Therefore, some examples further relate to a vehicle (e.g. a car, a truck, a motorcycle, an airplane, a ship, a drone, a helicopter, a bike, or a scooter) comprising an apparatus for determining a distance to an object according to one or more aspects of the proposed architecture or one or more examples described above.

The vehicle may further comprise a control circuit configured to control an autonomous movement of the vehicle based on a distance to an object in the vehicle's surrounding which is determined by the apparatus. In other words, the apparatus may provide distance information used for autonomous movement driving of the vehicle (e.g. for autonomous driving of a car).

Other examples relate to a medical device comprising an apparatus for determining a distance to an object according to one or more aspects of the proposed architecture or one or more examples described above. For example, the apparatus may be used in a medical device for medical imaging, patient motion monitoring, or for remote vital signs monitoring (e.g. cardiac and respiratory motion).

The examples as described herein may be summarized as follows:

Example 1 is an apparatus for determining a distance to an object, comprising: a first transceiver configured to transmit a first radio frequency signal; a second transceiver configured to transmit a second radio frequency signal in response to receiving the first radio frequency signal; and a processing circuit configured to determine the distance to the object based on a transmission time of the first radio frequency signal and a reception time, at the first transceiver, of a reflected component of the second radio frequency signal that is reflected by the object.

In example 2, the apparatus of example 1 further comprises an antenna system configured to radiate the first radio frequency signal and the second radio frequency signal towards the object.

In example 3, the antenna system in the apparatus of example 2 comprises: a first antenna element configured to radiate the first radio frequency signal into the environment; and a second antenna element configured to radiate the second radio frequency signal into the environment, wherein the first antenna element and the second antenna element are oriented towards the object.

In example 4, the antenna system in the apparatus of example 3 further comprises an actuator configured to adjust an orientation of the first and second antenna elements.

In example 5, the antenna system in the apparatus of example 2 comprises an antenna array configured to radiate the first radio frequency signal and the second radio frequency signal into the environment, wherein a main lobe of the antenna array's radiation pattern is oriented towards the object.

In example 6, the processing circuit in the apparatus of any of the preceding examples is further configured to determine the distance to the object based on a transmission time of the second radio frequency signal and a reception time, at the second transceiver, of a reflected component of the first radio frequency signal that is reflected by the object.

In example 7, the processing circuit in the apparatus of example 6 is configured to determine the distance to the object based on a relationship between the speed of light, a first difference between the transmission time of the first radio frequency signal and the reception time, at the first transceiver, of the reflected component of the second radio frequency signal, a second difference between the transmission time of the second radio frequency signal and the reception time, at the second transceiver, of the reflected component of the first radio frequency signal, a difference between the first difference and the second difference, and a constant.

In example 8, the processing circuit in the apparatus of any of the preceding examples is configured to: determine a reception time of the received second radio frequency signal using a first algorithm for a Fine Time Measurement according to the IEEE 802.11 family of standards of the Institute of Electrical and Electronics Engineers; determine, using a second algorithm, a correction value for the reception time of the received second radio frequency signal based on the received second radio frequency signal; and determine the reception time of the reflected component of the second radio frequency signal by combining the reception time of the received second radio frequency and the correction value.

In example 9, the processing circuit in the apparatus of any of examples 1 to 7 is configured to: select a reception time of a signal peak of the received first radio frequency signal having the greatest amplitude as the reception time of the reflected component of the first radio frequency signal, or select a reception time of a signal peak of the received second radio frequency signal having the greatest amplitude as the reception time of the reflected component of the second radio frequency signal.

In example 10, the first radio frequency signal and the second radio frequency signal in the apparatus of any of the preceding examples are compliant to the IEEE 802.11 family of standards of the Institute of Electrical and Electronics Engineers.

In example 11, a carrier frequency of the first radio frequency signal or the second radio frequency signal in the apparatus of any of the preceding examples is about 700 MHz or more.

In example 12, a carrier frequency of the first radio frequency signal or the second radio frequency signal in the apparatus of any of the preceding examples is about 50 GHz or more.

In example 13, the first radio frequency signal and the second radio frequency signal in the apparatus of any of the preceding examples are signals of a burst of a Fine Time Measurement according to the IEEE 802.11 family of standards of the Institute of Electrical and Electronics Engineers.

In example 14, the apparatus of any of the preceding examples further comprises a first semiconductor chip comprising the first transceiver, and a second semiconductor chip comprising the second transceiver.

Example 15 is a mobile device comprising an apparatus for determining a distance to an object according to any of examples 1 to 14.

Example 16 is a vehicle comprising an apparatus for determining a distance to an object according to any of examples 1 to 14.

In example 17, the vehicle of example 16 further comprises a control circuit configured to control an autonomous movement of the vehicle based on a distance to an object in the vehicle's surrounding determined by the apparatus.

Example 18 is medical device comprising an apparatus for determining a distance to an object according to any of examples 1 to 14.

Example 19 is a means for determining a distance to an object, comprising: a means for transmitting a first radio frequency signal; a means for transmitting a second radio frequency signal in response to receiving the first radio frequency signal; and a means for determining the distance to the object based on a transmission time of the first radio frequency signal and a reception time, at the means for transmitting the first radio frequency signal, of a reflected component of the second radio frequency signal that is reflected by the object.

In example 20, the means for determining the distance to the object in the means of example 19 is further configured to determine the distance to the object based on a transmission time of the second radio frequency signal and a reception time, at the means for transmitting the second radio frequency, of a reflected component of the first radio frequency signal that is reflected by the object.

Example 21 is a method for determining a distance to an object, comprising: transmitting a first radio frequency signal by a first transceiver; transmitting, by a second transceiver, a second radio frequency signal in response to receiving the first radio frequency signal; and determining the distance to the object based on a transmission time of the first radio frequency signal and a reception time, at the first transceiver, of a reflected component of the second radio frequency signal that is reflected by the object.

In example 22, determining the distance to the object in the method of example 21 is further based on a transmission time of the second radio frequency signal and a reception time, at the second transceiver, of a reflected component of the first radio frequency signal that is reflected by the object.

In example 23, determining the distance to the object in the method of example 22 is based on a relationship between the speed of light, a first difference between the transmission time of the first radio frequency signal and the reception time, at the first transceiver, of the reflected component of the second radio frequency signal, a second difference between the transmission time of the second radio frequency signal and the reception time, at the second transceiver, of the reflected component of the first radio frequency signal, a difference between the first difference and the second difference, and a constant.

In example 24, determining the distance to the object in the method of any of the preceding examples comprises: determining a reception time of the received second radio frequency signal using a first algorithm for a Fine Time Measurement according to the IEEE 802.11 family of standards of the Institute of Electrical and Electronics Engineers; determining, using a second algorithm, a correction value for the reception time of the received second radio frequency signal based on the received second radio frequency signal; and determining the reception time of the reflected component of the second radio frequency signal by modifying the reception time of the received second radio frequency by the correction value.

In example 25, determining the distance to the object in the method of any of examples 21 to 23 comprises: selecting a reception time of a signal peak of the received first radio frequency signal having the greatest amplitude as the reception time of the reflected component of the first radio frequency signal, or selecting a reception time of a signal peak of the received second radio frequency signal having the greatest amplitude as the reception time of the reflected component of the second radio frequency signal.

In example 26, the first radio frequency signal and the second radio frequency signal in the method of any of the preceding examples are compliant to the IEEE 802.11 family of standards of the Institute of Electrical and Electronics Engineers.

In example 27, a carrier frequency of the first radio frequency signal or the second radio frequency signal in the method of any of the preceding examples is about 700 MHz or more.

In example 28, a carrier frequency of the first radio frequency signal or the second radio frequency signal in the method of any of the preceding examples is about 50 GHz or more.

In example 29, the first radio frequency signal and the second radio frequency signal in the method of any of the preceding examples are signals of a burst of a Fine Time Measurement according to the IEEE 802.11 family of standards of the Institute of Electrical and Electronics Engineers.

Insofar as it is referred to standards within the present disclosure, it is referred to the version (revision) of standard which is valid at the date of the first filing of the present disclosure. The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for determining a distance to an object, comprising:
   a first transceiver configured to transmit a first radio frequency signal;
   a second transceiver configured to transmit a second radio frequency signal in response to receiving the first radio frequency signal; and
   a processing circuit configured to determine the distance to the object based on a transmission time of the first radio frequency signal and a reception time, at the first transceiver, of a reflected component of the second radio frequency signal that is reflected by the object.

2. The apparatus of claim 1, further comprising:
   an antenna system configured to radiate the first radio frequency signal and the second radio frequency signal towards the object.

3. The apparatus of claim 2, wherein the antenna system comprises:
   a first antenna element configured to radiate the first radio frequency signal into the environment; and
   a second antenna element configured to radiate the second radio frequency signal into the environment, wherein the first antenna element and the second antenna element are oriented towards the object.

4. The apparatus of claim 3, wherein the antenna system further comprises:
   an actuator configured to adjust an orientation of the first and second antenna elements.

5. The apparatus of claim 2, wherein the antenna system comprises:
   an antenna array configured to radiate the first radio frequency signal and the second radio frequency signal into the environment wherein a main lobe of the antenna array's radiation pattern is oriented towards the object.

6. The apparatus of claim 1, wherein the processing circuit is further configured to determine the distance to the object based on a transmission time of the second radio frequency signal and a reception time, at the second transceiver, of a reflected component of the first radio frequency signal that is reflected by the object.

7. The apparatus of claim 6, wherein the processing circuit is configured to determine the distance to the object based on a relationship between the speed of light, a first difference between the transmission time of the first radio frequency signal and the reception time, at the first transceiver, of the reflected component of the second radio frequency signal, a second difference between the transmission time of the second radio frequency signal and the reception time, at the second transceiver, of the reflected component of the first radio frequency signal, a difference between the first difference and the second difference, and a constant.

8. The apparatus of claim 1, wherein the processing circuit is configured to:
   determine a reception time of the received second radio frequency signal using a first algorithm for a Fine Time Measurement according to the IEEE 802.11 family of standards of the Institute of Electrical and Electronics Engineers;
   determine, using a second algorithm, a correction value for the reception time of the received second radio frequency signal based on the received second radio frequency signal; and
   determine the reception time of the reflected component of the second radio frequency signal by combining the reception time of the received second radio frequency and the correction value.

9. The apparatus of claim 1, wherein the processing circuit is configured to:
   select a reception time of a signal peak of the received first radio frequency signal having the greatest amplitude as the reception time of the reflected component of the first radio frequency signal, or
   select a reception time of a signal peak of the received second radio frequency signal having the greatest amplitude as the reception time of the reflected component of the second radio frequency signal.

10. The apparatus of claim 1, wherein the first radio frequency signal and the second radio frequency signal are compliant to the IEEE 802.11 family of standards of the Institute of Electrical and Electronics Engineers.

11. The apparatus of claim 1, wherein a carrier frequency of the first radio frequency signal or the second radio frequency signal is about 700 MHz or more.

12. The apparatus of claim 1, wherein a carrier frequency of the first radio frequency signal or the second radio frequency signal is about 50 GHz or more.

13. The apparatus of claim 1, wherein the first radio frequency signal and the second radio frequency signal are signals of a burst of a Fine Time Measurement according to the IEEE 802.11 family of standards of the Institute of Electrical and Electronics Engineers.

14. The apparatus of claim 1, further comprising:
   a first semiconductor chip comprising the first transceiver; and
   a second semiconductor chip comprising the second transceiver.

15. A mobile device comprising an apparatus for determining a distance to an object according to claim 1.

16. A vehicle comprising an apparatus for determining a distance to an object according to claim 1.

17. The vehicle of claim 16, further comprising a control circuit configured to control an autonomous movement of the vehicle based on a distance to an object in the vehicle's surrounding determined by the apparatus.

18. A method for determining a distance to an object, comprising:
   transmitting a first radio frequency signal by a first transceiver;
   transmitting, by a second transceiver, a second radio frequency signal in response to receiving the first radio frequency signal; and
   determining the distance to the object based on a transmission time of the first radio frequency signal and a reception time, at the first transceiver, of a reflected component of the second radio frequency signal that is reflected by the object.

19. The method of claim 18, wherein determining the distance to the object is further based on a transmission time of the second radio frequency signal and a reception time, at the second transceiver, of a reflected component of the first radio frequency signal that is reflected by the object.

20. The method of claim 19, wherein determining the distance to the object is based on a relationship between the speed of light, a first difference between the transmission time of the first radio frequency signal and the reception time, at the first transceiver, of the reflected component of the second radio frequency signal, a second difference between the transmission time of the second radio frequency signal and the reception time, at the second transceiver, of the reflected component of the first radio frequency signal, a difference between the first difference and the second difference, and a constant.

21. The method of claim 18, wherein determining the distance to the object comprises:
   determining a reception time of the received second radio frequency signal using a first algorithm for a Fine Time Measurement according to the IEEE 802.11 family of standards of the Institute of Electrical and Electronics Engineers;
   determining, using a second algorithm, a correction value for the reception time of the received second radio frequency signal based on the received second radio frequency signal; and
   determining the reception time of the reflected component of the second radio frequency signal by modifying the reception time of the received second radio frequency by the correction value.

22. The method of claim 18, wherein determining the distance to the object comprises:
   selecting a reception time of a signal peak of the received first radio frequency signal having the greatest amplitude as the reception time of the reflected component of the first radio frequency signal, or
   selecting a reception time of a signal peak of the received second radio frequency signal having the greatest amplitude as the reception time of the reflected component of the second radio frequency signal.

23. The method of claim 18, wherein the first radio frequency signal and the second radio frequency signal are compliant to the IEEE 802.11 family of standards of the Institute of Electrical and Electronics Engineers.

24. The method of claim 18, wherein a carrier frequency of the first radio frequency signal or the second radio frequency signal is about 700 MHz or more.

25. The method of claim 18, wherein the first radio frequency signal and the second radio frequency signal are signals of a burst of a Fine Time Measurement according to the IEEE 802.11 family of standards of the Institute of Electrical and Electronics Engineers.

* * * * *